Dec. 11, 1962 S. R. BIDDLE 3,068,140
METHOD OF MAKING PLASTIC IDENTIFICATION PLATES
Filed March 3, 1958 3 Sheets-Sheet 1

INVENTOR.
STANLEY R. BIDDLE
BY
Wallace and Cannon
ATTYS.

Dec. 11, 1962    S. R. BIDDLE    3,068,140
METHOD OF MAKING PLASTIC IDENTIFICATION PLATES
Filed March 3, 1958    3 Sheets-Sheet 2
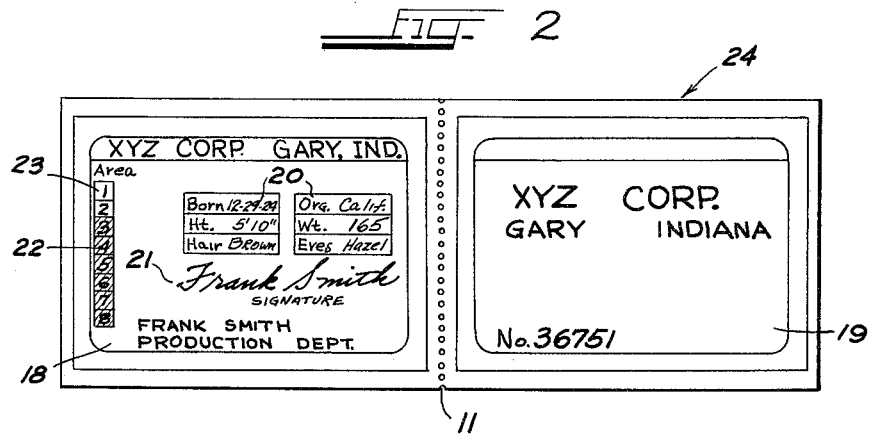
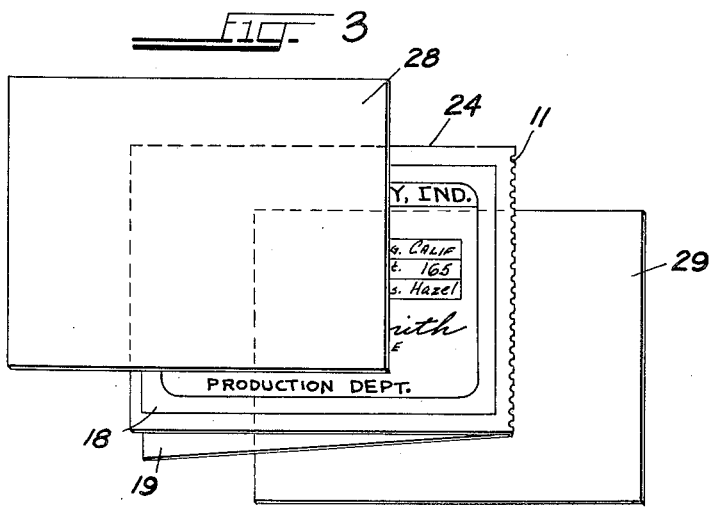
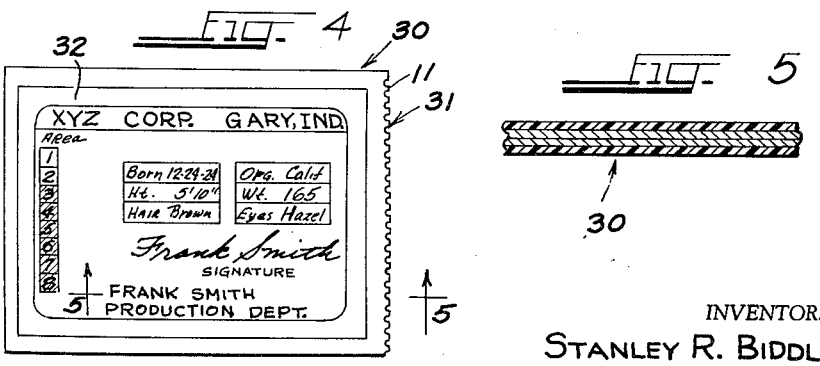
INVENTOR.
STANLEY R. BIDDLE
BY
Wallace and Cannon
ATTYS.

Dec. 11, 1962 S. R. BIDDLE 3,068,140
METHOD OF MAKING PLASTIC IDENTIFICATION PLATES
Filed March 3, 1958 3 Sheets-Sheet 3
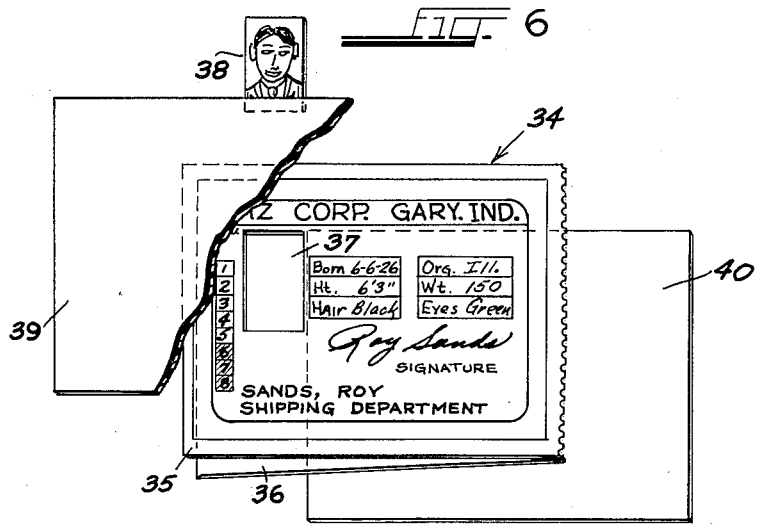
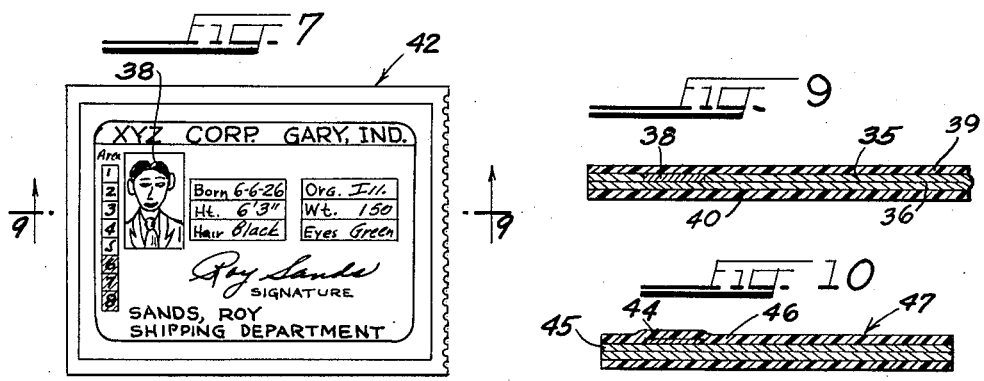
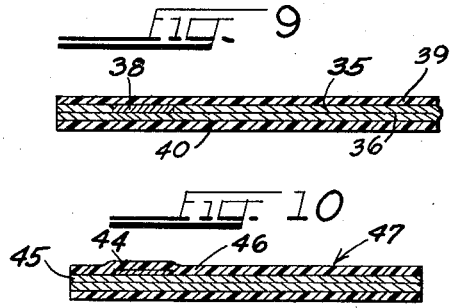
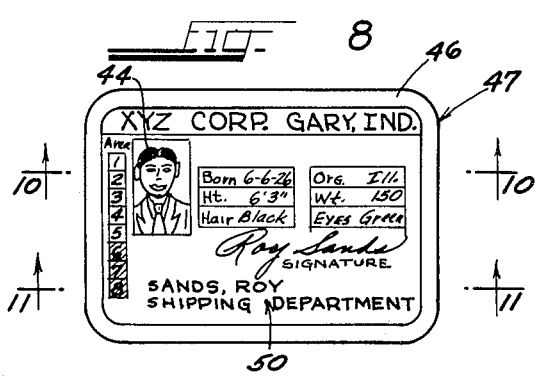
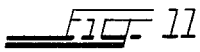
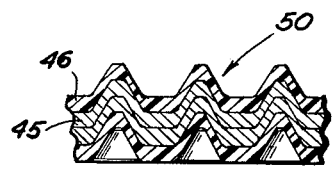
INVENTOR.
STANLEY R. BIDDLE
BY
Wallace and Cannon
ATT'YS.

United States Patent Office 3,068,140
Patented Dec. 11, 1962

3,068,140
METHOD OF MAKING PLASTIC IDENTIFICATION PLATES
Stanley R. Biddle, Euclid, Ohio, assignor to Addressograph-Multigraph Corporation, Cleveland, Ohio, a corporation of Delaware
Filed Mar. 3, 1958, Ser. No. 718,584
7 Claims. (Cl. 156—227)

This invention relates to a new and improved method of manufacturing or assembling individual identification devices which may be conveniently carried upon the person of the user and which may, in some instances, be utilized as printing devices.

Plastic identification plates have been utilized in a number of different applications as a means for identifying different individuals for credit and other purposes. These identification devices are extremely light in weight and may be made relatively thin and flexible, thereby affording a convenient identification plate which may readily be carried upon the person of the individual requiring identification. In some instances, moreover, the plastic identification device is embossed with type characters to provide a means for utilizing the identification device in the rapid and accurate preparation of records relating to credit transactions or other transactions requiring records. A preferred form of identification device of this kind is described and claimed in the co-pending application of Donald L. Erickson, Serial No. 615,170, filed October 10, 1956, now abandoned, and comprises a laminar plastic blank having an opaque core with the necessary identification data imprinted or otherwise inscribed thereon. This core is covered with a transparent plastic film on at least one side thereof, the film being fused to the core under heat and pressure. In the printing device described in the Erickson application, the laminar identification device is embossed with suitable type characters to afford a printing plate which may be utilized in conjunction with a band operated or other printing machine.

In the manufacture of identification devices of the kind described hereinabove, substantial difficulty may be encountered in typing or otherwise inscribing specific identification data upon the core portions of the devices. If the core material is made relatively thick to afford a printing plate or other identification card capable of withstanding use over a long period, the resulting thickness and stiffness of the core make it difficult to handle the core material in a conventional typewriter. On the other hand, if the core is made in two or more sections, the sections thereof bearing data relating to a single individual and necessary for fabricating a complete identification device may become separated from each other and may result in the fabrication of devices which do not identify any individual correctly. This is particularly true in those instances where both sides of the identification device carry data relating to a specific individual.

The primary object of the invention, therefore, is a new and improved method of manufacturing plastic identification devices which greatly facilitates and simplifies the manufacturing process.

A more specific object of the invention is a new and improved method of manufacturing plastic identification devices which makes it possible to utilize a conventional typewriter or other similar equipment in inscribing specific identification data upon the device.

Another object of the invention is a new and improved method of manufacturing an identification device which greatly reduces the amount of handling necessary for fabrication of the device.

A further object of the invention is a new and improved method of manufacturing identification devices which is inherently simple and economical and yet permits maximum flexibility in the makeup of the devices.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

FIG. 2 shows the core portion of the identification device at a subsequent stage of manufacture;

FIG. 3 is an exploded perspective view employed to illustrate a subsequent stage of the manufacturing method;

FIG. 4 illustrates the identification device at a later stage of fabrication;

FIG. 5 is a detail sectional view taken along line 5—5 in FIG. 4;

FIG. 6 is an exploded perspective view utilized in describing a modification of the inventive method;

FIG. 7 shows the identification device of FIG. 6 at a subsequent stage of manufacture;

FIG. 8 illustrates a complete identification device fabricated in accordance with the method of the invention;

FIG. 9 is a sectional view taken along line 9—9 in FIG. 7;

FIG. 10 is a sectional view, taken along line 10—10 in FIG. 8, and is employed to illustrate a further modification of the invention; and FIG. 11 is a greatly enlarged sectional view of an identification device taken generally as indicated by line 11—11 in FIG. 8.

Figure 1:
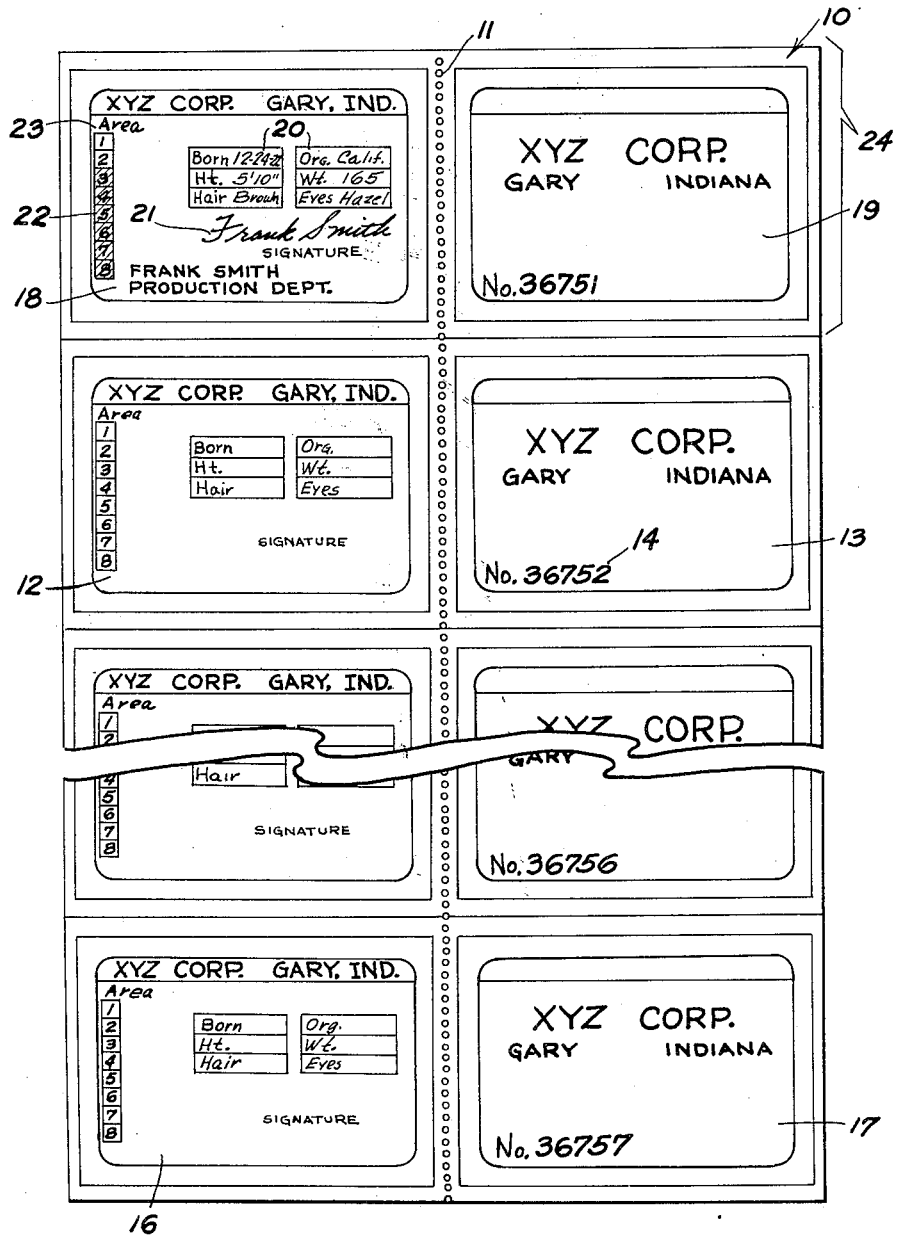
FIG. 1 illustrates an early stage in the manufacture of identification devices in accordance with the inventive method.

The basic manufacturing method of the invention may best be understood by reference to the several stages of manufacture illustrated in FIGS. 1–5. The starting material for the identification devices comprises a base sheet 10 of plastic material. The base sheet 10 should be relatively thin and flexible and should be opaque in order to provide for legibility of identification data imprinted or otherwise inscribed upon both sides of an identification device as more fully described hereinafter. The plastic from which the base sheet 10 is fabricated should be one which is dimensionally stable over a relatively wide range of temperatures; preferably, the plastic should exhibit only minor dimensional variations over a temperature range of the order of −20° F to +150° F A sheet of vinyl chloride approximately six to ten thousands inch thick has been found to be suitable for this purpose, although the invention is not limited to use of this particular plastic material or to a critical thickness range.

As a preliminary step in the manufacture of identification devices the base sheet 10 is punched or otherwise perforated as indicated by reference numeral 11 in FIG. 1 along the longitudinal center line thereof. The perforated center line 11 is subsequently utilized to facilitate folding of the base sheet as described more fully hereinafter. The perforations should extend for the full length of the base sheet, which is made equal to the total overall height of a substantial number of identification devices. In the case of the base sheet 10, the total height of the base sheet is large enough to provide for seven individual printing devices; this particular number is not critical, however, and may be varied as desired. Indeed, the base sheet 10 may comprise a substantially continuous web of plastic having a length great enough to provide for a multiplicity of identification devices if desired.

At an early stage of the manufacturing process, the base sheet 10 is imprinted with general identification data for both the obverse and the reverse sides of a plurality of identification devices. Moreover, the data for the obverse and reverse sides of each device are disposed in paired juxtaposed relation to each other on opposite sides of the perforated center line 11. Thus, the general identification data for the obverse side of one device is printed in the area indicated by reference numeral 12 on the base sheet 10 and the data relating to the reverse side of the same device is printed on portion 13 of the sheet immediately across the center line 11 from the area 12. As a typical example, the base sheet 10 in FIG. 1 is imprinted with general data identifying the name of a corporation and its location and also imprinted with additional indicia providing for identification of a particular person, although specific data relating to a given person are not filled in at this stage of fabrication. In some instances it may be desirable to imprint some of the specific data along with the general data; thus, a serial number 14 might well be imprinted upon the base sheet 10 along with the general data or immediately after the printing of the general data. The particular format illustrated in FIG. 1 relates to identification cards for a manufacturing plant in which individual employees may be restricted to given areas of operation and in which, for security purposes, a description of the employee is included on the identification device. Further complete general data sections for the obverse side of the identification devices are indicated by reference numerals 16 and 18, the corresponding reverse-side data being shown in the area 17 and 19 of the sheet 10.

After the general data common to all of the identification devices have been imprinted upon the base sheet 10, specific identification data concerning an individual employee are inscribed upon the sheet. Thus, data relating to the place and date of birth, the height, the weight and other characteristics of an employee may be typed or otherwise inscribed upon th obverse-side area 18 of the sheet as generally indicated by the reference numeral 20. In addition, the employee may be asked to sign the sheet as indicated by reference numeral 21 and the plant area to which he is permitted access may be indicated by suitable means such as by marking out certain portions 22 of the area-identification portion 23 of the sheet. In some instances, however, it may be desirable to defer the typing or writing of the specific identification data upon the base sheet until a subsequent stage in the fabricating process; this is particularly true wth respect to the signature 21.

After the general identification data have been imprinted upon the base sheet 10, and preferably after typing of specific identification data thereon, the base sheet is cut into individual pieces. Thus there is separated from the base sheet 10 an identification device segment 24 comprising the obverse-side portion 18 and the corresponding reverse-side portion 19. This stage of the manufacturing method is illustrated in FIG. 2, in which the identification device segment 24 is shown severed completely from the base sheet 10. In many instances, it is most convenient to have the employee or other individual who is to use the identification device apply the signature 21 thereto at this stage of manufacture. Moreover, under some circumstances it may also be desirable to type, write, or otherwise inscribe the specific identification data 20 and 22 upon the device at this stage of manufacture.

After all of the necessary identification data have been applied to the device, and after the segment 24 has been cut from the original multiple-device sheet, the individual segment is folded along the center line 11 as indicated in FIG. 3. In folding the identification device segment, the obverse and reverse side portions 18 and 19 are disposed in back-to-back relation, thereby exposing all of the identification data. The folded segment is then covered with transparent plastic material. Preferably, a pair of individual sheets 28 and 29 are disposed over the exposed faces of the opposite sides 18 and 19, respectively, of the identification device. The plastic material from which the transparent sheets 28 and 29 are fabricated must be one which can be effectively fused to the plastic from which the core or base portion 24 of the device is made. Preferably, where vinyl chloride is employed as the core or base sheet material, the two sheets or films 28 and 29 are also made from vinyl chloride. In at least one application vinyl chloride having a thickness of approximately five mils has been found to be satisfactory for this purpose, although the thickness is not critical.

With the transparent sheets 28 and 29 in position on the opposite sides of the core segents 24, all of the plastic sheets are fused together under heat and pressure. Thus, in a single operation the sheet 28 is fused to the face of the core segment portion 18 and the transparent film 29 is fused to the exposed face of the portion 19. In this manner the individual sheets, including the two folded portions of the core segment 24, are fused together to form the unitary protected identification device 30, as illustrated in FIGS. 4 and 5. At this stage of manufacture the identification device is complete but is not particularly suitable for carrying upon the person of an individual buyer in a credit identification system, or an employee or other party in other identification systems. The relatively rough edge 31 formed by folding the core along the perforated center line 11 makes the device awkward and is highly objectionable in many instances. It is a simple matter, however to trim the edges of the identification device 30 to approximately correspond to the external outline 32 of the identification data, thereby completing the manufacturing process.

Manual operations, in manufacturing the individual identification devices in accordance with the above described method, are held to a minimum. Both sides of the identification device are completed while the core portion or base sheet 10 is relatively thin and flexible and can be handled in an ordinary typewriter or in inexpensive printing machines. There is virtually no possibility that two halves of a single identification device will become separated from each other, since both the obverse and reverse faces are imprinted upon one side of a single sheet of material. The completed fused laminar identification device is sturdy and can withstand extended periods of use; on the other hand, the device is extremely light in weight and flexible and may be made thin enough for convenient carrying in a wallet. Each device is quickly and conveniently inscribed with data specific to an individual person by a method which retains the best features of mass manufacture of the devices.

FIG. 6 illustrates a modification of the manufacturing procedure which may be followed where it is desired to incorporate a photograph or other separate identification article in the complete identification device. The basic material employed is the same and the initial steps of manufacturing may also be the same as described hereinabove in connection with FIGS. 1–5. Thus, in the view of FIG. 6 which corresponds with FIG. 3, the imprinted base sheet or core 34, complete with all identification data, is folded upon itself to place the observe side 35 in back-to-back relation with respect to the reverse side 36. In this instance, however, and preferably before the base sheet segment 34 is folded, an aperture 37 is punched or cut in the observe side portion 35 of the base sheet. This aperture 37 corresponds in dimensions to a photograph or other identification article 38.

Subsequently, the photograph 38 is disposed in the aperture 37 and the two transparent covered sheets 39 and 40 are placed over the exposed faces of the folded base sheet segment 34. Thereafter, the entire group of laminations is fused together under heat and pressure to form the unitary identification device 42 illustrated in FIG. 7.

FIG. 9 affords a sectional view of the device 42 and illustrates the positioning of the photograph 38 within the aperture in the obverse side portion 35 of the core of the identification device.

As indicated in FIG. 9, the mounting of the photograph 38 within an aperture in a central portion or core of the identification device prevents any bulging or irregularity in the surface contour of the device. Although this may be a desirable feature in those instances where appearance is a particularly important factor, it is by no means essential to the manufacture of practical and effective identification devices. This is particularly true where the photograph or other similar article is relatively thin. Thus, and as illustrated in FIGS. 8 and 10, a photograph 44 may be incorporated in an identification device 47 constructed in accordance with the inventive method simply by locating the photograph between the face portion 45 of the device and the covering transparent plastic sheet 46. When the covering film or sheet is fused to the obversive side portion of the base sheet, the photograph 44 is effectively entrapped between the two and remains permanently located in the desired position in the identification device 47. Although a very slight bulge may be formed in the surface of the device 47, it is usually not noticeable; indeed, if the fusing pressure is relatively high no perceptible bulge may be formed.

As pointed out hereinabove, in many instances it may be desirable to utilize the identification device in printing credit records or other transaction records. When this is the case, specific identification data such as indicated by reference numeral 50 in FIGS. 8 and 11 may be embossed in the identification device. The embossed data 50 makes it possible to employ the identification device as a printing plate in a conventional hand operated or other printing machine, thereby greatly facilitating the preparation of numerous kinds of records. Thus, the identification device may be employed in the preparation of sales records in a credit verification system, may be utilized in checking out books from a library (as described in detail in the aforementioned Erickson application, Serial No. 615,170), in checking out tools from a tool room and in other applications. It will, of course, be recognized that in many instances, and as illustrated by the identification device 47, it is desirable to type or otherwise inscribe some of the specific identification data upon the device and to emboss other portions of the data into the device, depending upon the record-keeping requirements of the particular application in which the device is employed.

Hence, while the preferred embodiment of the invention has been illustrated and described, it is to be understood that this is capable of variation and modification, and I therefore do not wish to be limited to the precise details set forth, but desire to avail myself of such changes and alterations as fall within the purview of the following claims.

I claim:

1. The method of assembling an identification device comprising the following steps: imprinting one side only of a thin opaque base sheet of thermoplastic material in parallel columns with general identification data respectively in individual columns for the obverse and reverse sides of a plurality of identification devices, the data for the obverse and reverse sides of each device being disposed in transverse paired juxtaposed relation to each other; separating from said sheet a plurality of two-part identification-device segments each comprising left and right hand portions bearing both obverse-side and reverse-side general data; arranging each of said identification-device segments to dispose the obverse and reverse side portions thereof in back-to-back relation; fusing covering sheets of substantially transparent thermoplastic material onto the obverse and reverse side portions of each portion of each of said segments and simultaneously fusing the two portions included in each of said segments together under heat and pressure to form a protected unitary identification device indivisible along the planes of fusion.

2. The method of assembling an identification device comprising the following steps: imprinting one side only of a thin opaque base sheet of thermoplastic material having a perforated center line with general identification data on opposite sides of the center line for the obverse and reverse sides of a plurality of identification devices, that data for the obverse and reverse sides of each device being disposed in paired juxtaposed relation to each other on opposite sides of said center line; separating from said sheet a plurality of two-part identification-device segments each comprising said general data; folding an identification device segment along said center line to dispose the obverse and reverse side portions thereof in back-to-back relation; disposing sheets of substantially transparent thermoplastic material over the opposite sides of the folded segment; and fusing the transparent thermoplastic sheets and the two portions of said segment all together under heat and pressure to form a protected unitary identification device indivisible along the planes of fusion.

3. The method of assembling an identification device comprising the following steps: imprinting one side only of a thin opaque base sheet of thermoplastic with general identification data for the obverse and reverse sides of a plurality of identification devices, the data for the obverse and reverse sides of each device being disposed in paired juxtaposed relation to each other; cutting said sheet into a plurality of corresponding identification-device segments each comprising an obverse-side portion and a corresponding portion bearing reverse-side data; folding each of said identification-device segments to dispose the obverse and reverse side portions thereof in back-to-back relation; disposing sheets of substantially transparent thermoplastic over the exposed opposite sides of each of said segments; and fusing the transparent thermoplastic sheets and the two portions of each of said segments together under heat and pressure to form a plurality of protected unitary identification devices indivisible along the planes of fusion.

4. The method of manufacturing an identification device comprising the following steps: imprinting one side only of a thin opaque base sheet of thermoplastic material with general identification data for the obverse and reverse side portions of a plurality of identification devices, the data for the obverse and reverse side portions of each device being disposed in transverse paired juxtaposed relation to each other; separating from said sheet a plurality of identification-device segments comprising said obverse portion and the corresponding reverse portion; folding said identification-device segment to dispose the obverse and reverse side portions thereof in back-to-back relation; and fusing a sheet of substantially transparent thermoplastic material onto the obverse and reverse side portion of said segment and simultaneously fusing the two portions of said segment together under heat and pressure to form a protected unitary identification device indivisible along the planes of fusion.

5. The method of manufacturing an identification device comprising the following steps: imprinting one side only of a thin opaque base sheet of thermoplastic material with general identification data for the obverse and reverse sides of a plurality of identification devices, the data for the obverse and reverse sides of each device being disposed in paired juxtaposed relation to each other; inscribing specific identification data upon the portion of said sheet bearing the obverse-side general data for one of said devices; separating from said sheet an identification-device segment comprising said inscribed portion and the corresponding portion bearing reverse-side general data; cutting out a portion in the sheet bearing the obverse-side general data; folding said identification-device segment to dispose the obverse and reverse side portions thereof in back-to-back relation; mounting a photograph within said cut-out portion; disposing sheets of substantially transparent thermoplastic over the opposite sides of said folded segment; and fusing the transparent thermoplastic material sheets and the two portions of said segment all together under heat and pressure to form a protected unitary identification device, indivisible along the planes of fusion, with said photograph encapsulated therein.

6. The method of assembling an identification device from an opaque thermoplastic material base sheet imprinted with general identification data for a number of such devices, the data for the obverse and reverse sides of each device being disposed in paired juxtaposed relation to each other on opposite sides of a perforated center line, said method comprising the following steps: separating from said sheet an identification-device segment comprising portions bearing both observe-side and reverse-side general data; folding said identification-device segment to dispose the obverse and reverse side portions thereof in back-to-back relation; and fusing a sheet of substantially transparent thermoplastic material onto the obverse and reverse side portions of said segment and simultaneously fusing the two portions of said segment together under heat and pressure to form a protected unitary identification device indivisible along the planes of fusion.

7. The method of assembling an identification device from an opaque thermoplastic material base sheet imprinted with general identification data for a number of such devices, the data for the obverse and reverse sides of each device being disposed in paired juxtaposed relation to each other on opposite sides of a center line of weakened union, said method comprising the following steps: inscribing specific identification data upon the portion of said sheet bearing the obverse-side general data for one of said devices; separating from said sheet an identification-device segment comprising said inscribed portion and the corresponding portion bearing reverse-side general data; cutting out a portion in the sheet bearing the obverse-side general data; folding said identification-device segment to dispose the obverse and reverse side portions thereof in back-to-back relation; mounting a photograph within said cut-out portion; disposing sheets of substantially transparent thermoplastic material upon the opposite sides of the folded segment, and simultaneously fusing the transparent sheets and the two portions of said segment all together under heat and pressure to form a protected unitary identification device indivisible along the planes of fusion.

References Cited in the file of this patent

UNITED STATES PATENTS

| | | |
|---|---|---|
| 1,034,600 | Elliot | Aug. 6, 1912 |
| 1,257,541 | Sillcocks | Feb. 26, 1918 |
| 1,480,200 | Elliot | Jan. 8, 1924 |
| 1,502,137 | De Foreest et al. | July 22, 1924 |
| 1,872,130 | Elliot | Aug. 16, 1932 |
| 2,274,488 | Kutcher | Feb. 24, 1942 |
| 2,294,465 | Lasker | Sept. 1, 1942 |
| 2,361,670 | Whitehead | Oct. 31, 1944 |
| 2,520,077 | Wolowitz | Aug. 22, 1950 |
| 2,537,732 | Angus | Jan. 9, 1951 |
| 2,588,067 | Whitehead | Mar. 4, 1952 |
| 2,645,178 | Brainard et al. | July 14, 1953 |
| 2,671,678 | Walsh | Mar. 9, 1954 |
| 2,780,015 | Whitehead | Feb. 5, 1957 |
| 2,802,418 | Carver et al. | Aug. 13, 1957 |